May 18, 1954
E. S. GANDRUD
2,678,756
AGITATOR CONSTRUCTION FOR FERTILIZER
SPREADERS AND THE LIKE
Filed Oct. 11, 1950
2 Sheets-Sheet 1
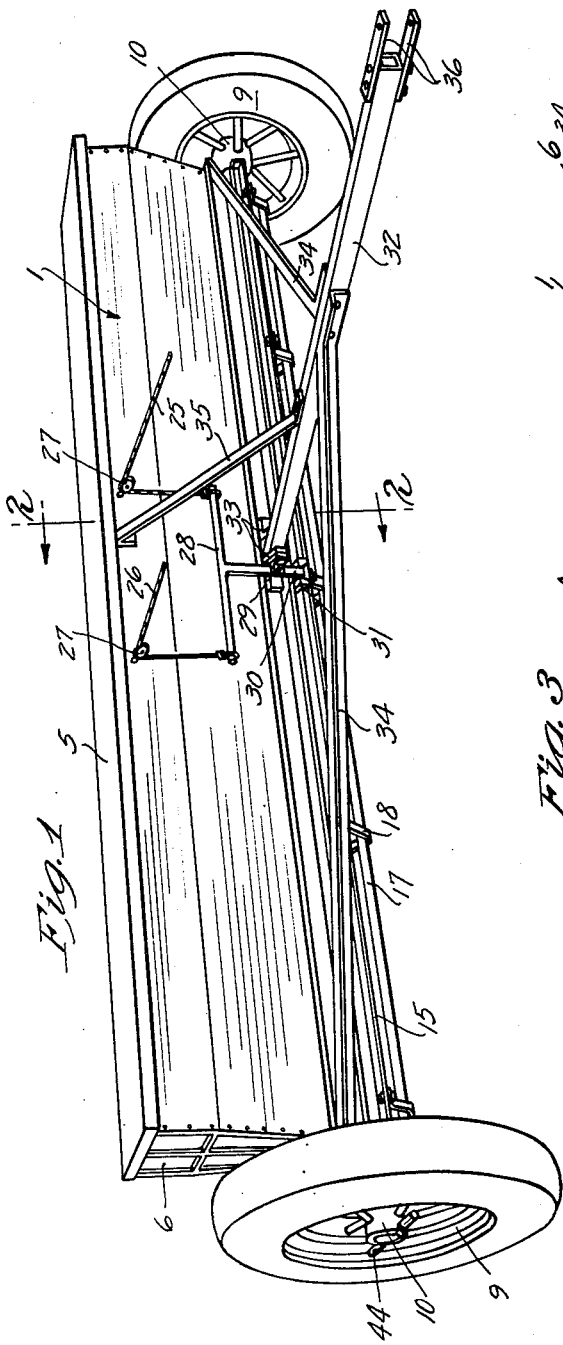
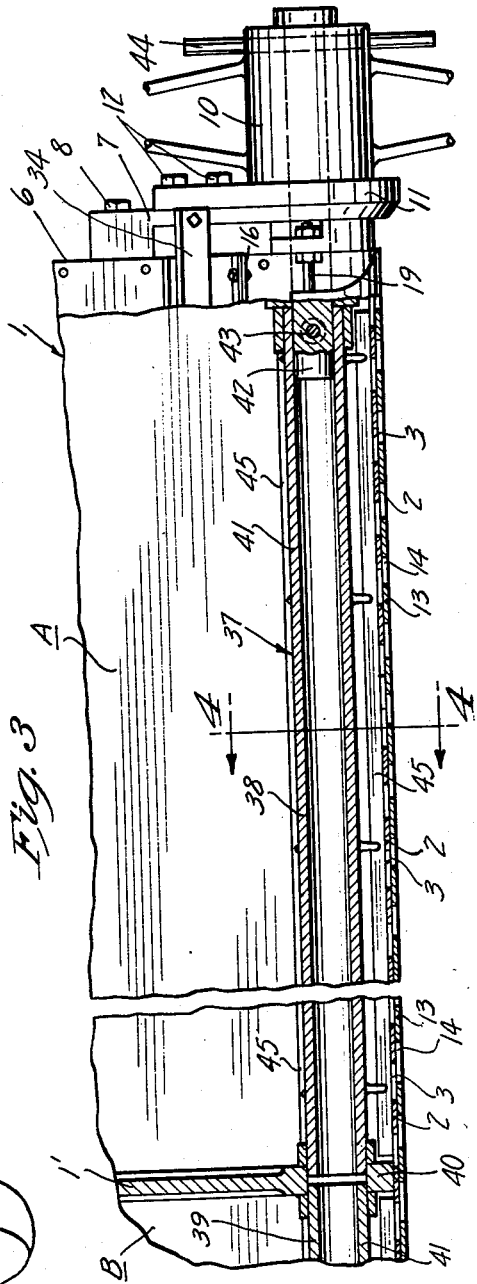
Inventor
Eberhard S. Gandrud
By Merchant & Merchant
Attorney

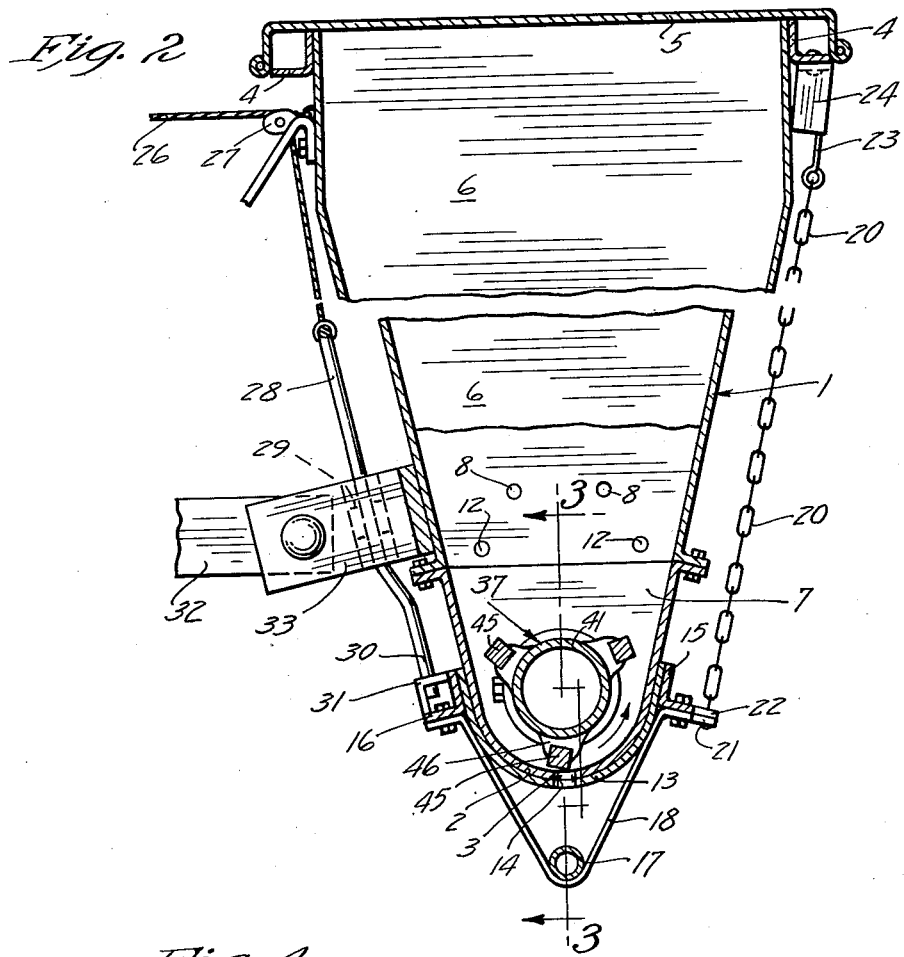
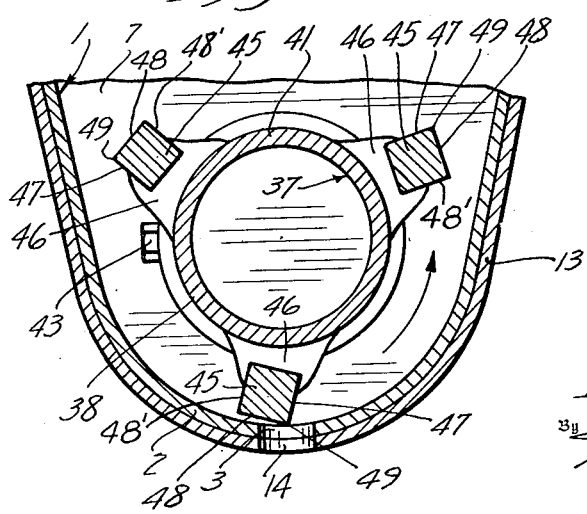

Patented May 18, 1954

2,678,756

UNITED STATES PATENT OFFICE 2,678,756

AGITATOR CONSTRUCTION FOR FERTILIZER SPREADERS AND THE LIKE

Ebenhard S. Gandrud, Owatonna, Minn.

Application October 11, 1950, Serial No. 189,642

1 Claim. (Cl. 222—410)

My invention relates generally to spreaders for fertilizers, seeds, and the like and, more specifically, to improvements in machines for distributing granular or powdered fertilizers that will flow under the action of gravity when agitated or kept in a loose condition.

More particularly, my invention is in the nature of an improved agitator rotor for fertilizer spreaders of the type disclosed in my prior United States Letters Patent No. 2,350,107, issued May 30, 1944.

In the broadcasting or distribution of fertilizers in granular or powdered form, difficulty is often experienced in that some types of fertilizers tend to become packed in the hopper from whence they are intended to be distributed. In some instances, even the conventional agitator tends to pack the material against the side and bottom wall portions of the hopper, upon which the machine must be stopped and manually cleaned, or at least the packed material must be manually loosened. An important object of my invention is, therefore, the provision of an improved agitator for spreaders of the type set forth, which will effectively prevent such packing of the material in the hopper and which will insure proper delivery of the fertilizer to the field.

Another object of my invention is the provision of an agitator for spreaders of the above type which will have a cleaning effect on the inner discharge portion of the hopper.

Still another object of my invention is the provision of an agitator as set forth which is easily produced from stock materials, which is highly efficient in operation, and which is rugged in construction and durable in use.

Other highly important objects and advantages of my invention will become apparent from the following detailed specification, appended claim, and attached drawings.

Referring to the drawings which illustrate the invention, and in which like characters indicate like parts throughout the several views:

Fig. 1 is a view in perspective of a spreader built in accordance with my invention, looking at the same from the front toward the rear;

Fig. 2 is an enlarged vertical section taken approximately on the line 2—2 of Fig. 1, some parts being broken away;

Fig. 3 is a fragmentary section taken substantially on the line 3—3 of Fig. 2; and Fig. 4 is a greatly enlarged fragmentary section taken on the line 4—4 of Fig. 3.

Referring with greater detail to the drawings, the spreader is shown as comprising a hopper 1 preferably largely made from sheet metal and formed with a concave or approximately semi-cylindrical bottom portion 2 provided with longitudinally spaced diamond-shaped discharge passages 3. At its top, the hopper is shown as reinforced by angle irons or the like 4 and is provided with a removable or displaceable cover 5.

At the lower portion of its opposite sides or ends 6, the hopper 1 has rigidly secured bearing plates comprising the bottom portions of the end plates 6 and to which are rigidly secured wheel mounting members 7. The wheel mounting members 7 are secured to the end plates 6 by bolts or the like 8.

A pair of laterally spaced pneumatic tire-equipped mounting wheels 9 have hubs 10 that are journalled on trunnion portions of the wheel mounting members 7 and are retained against axial movements by retaining plates 11 rigidly secured to the mounting members 7 by threaded bolts or the like 12, all as clearly shown in my prior United States patent above identified.

A concave valve-acting gate 13 underlies the perforate bottom portion 2 of the hopper 1 and fits thereagainst as best shown in Figs. 2 to 4 inclusive. The gate 13 is provided with diamond-shaped discharge passages 14 which correspond in form and spacing to those in the bottom of the hopper and are adapted to be moved more or less into registration with the discharge ports 3 or to be moved entirely out of registration therewith. The upper edges of the gate 13 are reinforced by angle bars 15 and 16 rigidly secured thereto by rivets, spot welding, or the like. A scatter bar or rod 17 underlies the discharge passages 3 and 14 and is supported in spaced parallel relationship to the bottom of the hopper by a plurality of hanger brackets 18 depending from the angle bars 15 and 16.

The valve-acting gate 13 is hinged at one side to the bottom portion of the hopper 1 by means of aligned supporting hinge pins 19, one of which is shown, see Fig. 3. The opposite side of the gate 13 is supported by link chains 20 secured at their lower ends to anchoring sections 21 which engage bifurcated laterally outwardly projecting prongs 22 on the angle bar 15. At their upper ends, the chains are secured to longitudinally movable anchoring rods 23 which are yieldingly biased in a direction to maintain the gate 13 in contact with the bottom of the hopper by springs not shown but contained within casings 24 rigidly secured to one of the strengthening angle bars 4. This structure is disclosed in detail in my prior Patent No. 2,350,107.

As further disclosed in my said prior patent, the hinge pins 19 and the flexible connections 20 permit longitudinal valve movements of the gate 13, and such movements may be imparted to the gate 13 by manipulation of one or the other of a pair of control cables 25 and 26 one each running over one of a pair of pulleys 27 and attached at one of their ends to the opposite ends of a T-shaped operating lever 28. The lever 28 is pivotally secured to the hopper 1 as indicated at 29 and has one end portion 30 disposed between a pair of spaced lugs 31 welded or otherwise rigidly secured to the intermediate portion of the angle bar 16. The machine is further provided with a forwardly projecting tongue 32 pivotally secured at its rear end to a bracket 33 on the hopper 1 and reinforced by diagonally disposed race members 34 and a central race member 35. At its front end, the tongue 32 is provided with connector bars 36 for the coupling thereof to the drawbar of a tractor or the like, not shown.

As above indicated, in the spreading of granular or powdered fertilizer or the like, there is often a tendency of certain fertilizer compounds to become tightly packed in the hopper sufficient to prevent flow thereof through the apertures 3 and 14 when said apertures are in partial or full registration. This packed condition is further aggravated by jarring movements imparted to the machine when the same is moved over uneven terrain during its travel to the desired location. For this reason, it has been found necessary to provide agitators for machines of this type to maintain the fertilizer material in said loose condition while the same is being spread. I have found that with conventional agitators, some fertilizer compounds tend to become packed between the agitator and the bottom of the hopper to such a degree under rotary movement of the agitator that free flow through the spreader apertures is deterred or in some cases altogether prevented. To overcome the above noted deficiency, I provide an agitator 37 of novel design and which comprises a pair of axially aligned rotary members 38 and 39. The hopper 1 is divided into compartments A and B by a central partition 1', the bottom portion of which provides a housing for a bearing 40. The agitator members include tubular shafts 41, the adjacent inner ends of which are journalled in the bearing 40 and the outer ends of which are mounted on axially movable hub shafts 42 and keyed thereto by removable bolts or the like 43, one each of which is shown. The hub shafts 42 extend through the hubs 10 of the wheels 9 and are anchored for common rotation therewith by transversely extended driving pins 44 in a manner clearly disclosed in my prior patent, above identified. The tubular shafts 41 of my improved agitator 37 are in concentric relationship to the arcuate bottom of the hopper 1 and in axial alignment with the aligned axes of rotation of the wheels 9, and have rigidly secured thereto in equidistantly spaced parallel relationship a plurality of circumferentially spaced agitator bars 45. The agitator bars 45 are preferably made from cross-sectionally rectangular bar stock and are welded or otherwise rigidly secured to the shafts 41 at axially spaced points thereon and as indicated at 46. As shown, particularly with reference to Figs. 2 and 4, each of the agitator bars 45 is disposed to provide a leading face 47, a radially outer face 48 and a trailing plane face 48'. The leading and radially outer faces define a leading edge 49. As shown, the bars 45 are so disposed relative to the tubular shafts 41 that the leading edges 49 form the most radially outwardly projected portions of the agitators. Said leading edges 49 have only sufficient clearance from the bottom of the hopper to permit free rotation of the agitator and the angular disposition of the bars 45 cause this clearance to expand from the leading edges 49 to the trailing edges of said bars.

From the above, it should be appreciated that when the agitator 41 is rotated in its normal direction, as indicated by arrows in Figs. 2 and 4, that the agitator bars 45 will tend to maintain the bottom of the hopper in a clean condition by reason of the fact that the leading edges 49 thereof act in the manner of cutting tools. The clearance (expanding rearwardly in the direction of rotation of the agitator) between the radially outer faces 48 and the bottom wall portions 2 effectively prevents packing of the fertilizer material between the bars 45 and the bottom portion 2 of the hopper 1.

My invention has been thoroughly tested and found to be completely satisfactory for the accomplishment of the objectives set forth; and, while I have shown and described a commercial embodiment of my novel agitator structure, it will be understood that the same is capable of modification without departure from the spirit and scope of the invention as defined in the claim.

What I claim is:

In a device of the kind described, a hopper having side walls and a perforate bottom wall in the form of a portion of a cylinder, an agitator mounted in said hopper in parallel relation to said bottom wall, said agitator comprising a rotary shaft and an agitator bar rigidly secured to said shaft in spaced parallel relation thereto, said bar being rectangular in cross section and providing an advancing plane face, a radially outer plane face and a trailing plane face, the advancing face and the radially outer face intersecting in a relatively sharp edge movable along the inner surface of said bottom wall in close relation thereto, the said advancing face being disposed at a relatively small angle to a plane including the axis of said shaft and said edge, and the said radially outer face being disposed at a relatively large angle to said plane with the edge at the intersection of said radially outer and trailing faces being disposed a relatively short distance inwardly of the cylindrical path of rotation of said first edge whereby said radially outer face is inclined inwardly from said first edge to said second edge at an angle to a tangent plane including said first edge which is substantially equal to said first angle.

References Cited in the file of this patent

UNITED STATES PATENTS

| Number | Name | Date |
| --- | --- | --- |
| 582,241 | Stevens | May 11, 1897 |
| 1,065,665 | Cunningham | June 24, 1913 |
| 1,256,854 | Wickliffe | Feb. 19, 1918 |
| 1,931,670 | Miller | Oct. 24, 1933 |
| 2,526,609 | Masters | Oct. 17, 1950 |